United States Patent
Yokoyama

(10) Patent No.: US 11,635,625 B2
(45) Date of Patent: Apr. 25, 2023

(54) VIRTUAL IMAGE DISPLAY DEVICE AND OPTICAL UNIT

(71) Applicant: SEIKO EPSON CORPORATION, Tokyo (JP)

(72) Inventor: Osamu Yokoyama, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 184 days.

(21) Appl. No.: 17/210,422

(22) Filed: Mar. 23, 2021

(65) Prior Publication Data

US 2021/0302739 A1    Sep. 30, 2021

(30) Foreign Application Priority Data

Mar. 24, 2020  (JP) .............................. JP2020-052220

(51) Int. Cl.
| G02B 27/01 | (2006.01) |
| G09G 3/00 | (2006.01) |
| G09G 5/37 | (2006.01) |

(52) U.S. Cl.
CPC ......... *G02B 27/0172* (2013.01); *G09G 3/003* (2013.01); *G09G 5/37* (2013.01); *G02B 2027/011* (2013.01); *G02B 2027/0127* (2013.01); *G09G 2340/0407* (2013.01); *G09G 2354/00* (2013.01)

(58) Field of Classification Search
None
See application file for complete search history.

(56) References Cited

U.S. PATENT DOCUMENTS

2015/0279114 A1*  10/2015  Yonekubo ............ G02B 6/0076
                                                         345/633
2019/0285895 A1    9/2019  Fujimaki

FOREIGN PATENT DOCUMENTS

| JP | H1184306 | 3/1999 |
| JP | H11109278 | 4/1999 |
| JP | 2005202221 | 7/2005 |
| JP | 2007248545 | 9/2007 |
| JP | 2018151459 | 9/2018 |
| JP | 2019159076 | 9/2019 |

* cited by examiner

*Primary Examiner* — Peter Hoang
(74) *Attorney, Agent, or Firm* — JCIPRNET

(57) ABSTRACT

Included are a first display element configured to display a first virtual image; a second display element configured to display a second virtual image; a combining optical member configured to combine first imaging light and second imaging light; a light-guiding optical system configured to guide light that passed through the combining optical member; and a correction optical system provided between the first display element and the combining optical member and configured to correct an aberration in accordance with a positional difference between the first display element and the second display element.

9 Claims, 6 Drawing Sheets

VIRTUAL IMAGE DISPLAY DEVICE AND OPTICAL UNIT

The present application is based on, and claims priority from JP Application Serial Number 2020-052220, filed on Mar. 24, 2020, the disclosure of which is hereby incorporated by reference herein in its entirety.

BACKGROUND

1. Technical Field

The present disclosure relates to a virtual image display device that presents a virtual image to an observer (user), and an optical unit that can be applied to the virtual image display device.

2. Related Art

For example, a head-mounted display apparatus, that is, a head-mounted display (HMD) is known. The HMD is mounted on the head and displays an image or the like in a region of the visual field of an observer. As the HMD, there is known an HMD that uses three display elements to perform projection through a common projection lens, thereby displaying images so that the distances from the observer to the images (virtual images) differ from each other (JP-A-2019-159076).

However, when the HMD having a configuration as described in the JP-A-2019-159076 is used and a plurality of display elements are used to display virtual images so that the distances (positions) from the observer to the virtual images differ from each other, if the HMD is configured such that the projection lens or the like is optimized so that a video with one of the display elements is made favorable, aberration occurs in the other display elements at different distances, which results in images being blurred.

SUMMARY

A virtual image display device according to one aspect of the present disclosure includes a first display element configured to display a first virtual image, a second display element configured to display a second virtual image at a position differing from the first virtual image, a combining optical member configured to combine first imaging light from the first display element and second imaging light from the second display element, a light-guiding optical system configured to guide light that passed through the combining optical member, and a correction optical system provided between the combining optical member and one of the first display element and the second display element and configured to correct an aberration in accordance with a positional difference between the first display element and the second display element.

DESCRIPTION OF EXEMPLARY EMBODIMENTS

First Embodiment

Below, one example of a virtual image display device according to a first embodiment of the present disclosure will be described with reference to the drawings.

Figure 1:
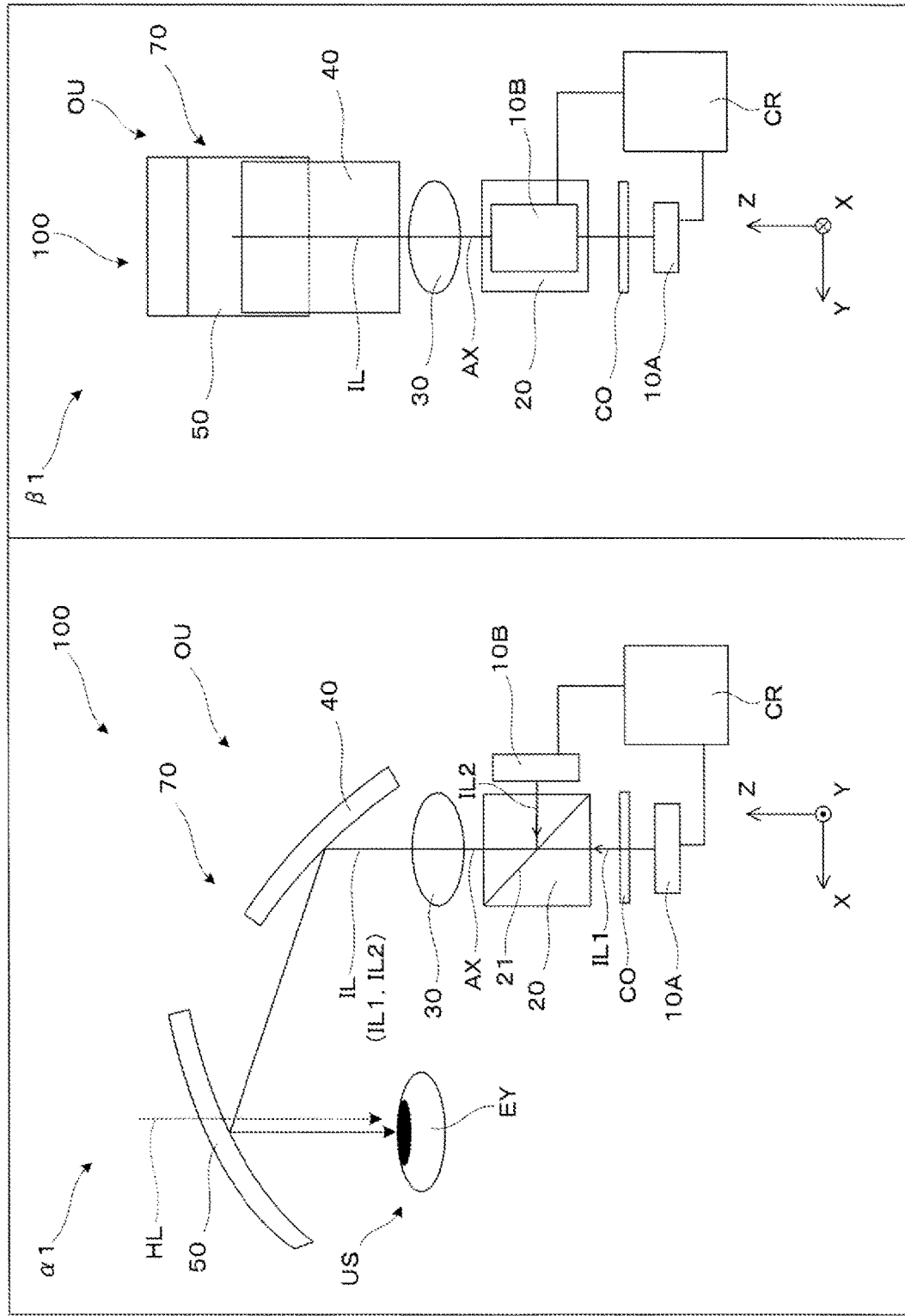
FIG. 1 is a plan view and a side view each schematically illustrating an optical configuration of a virtual image display device according to a first embodiment.
Figure 2:
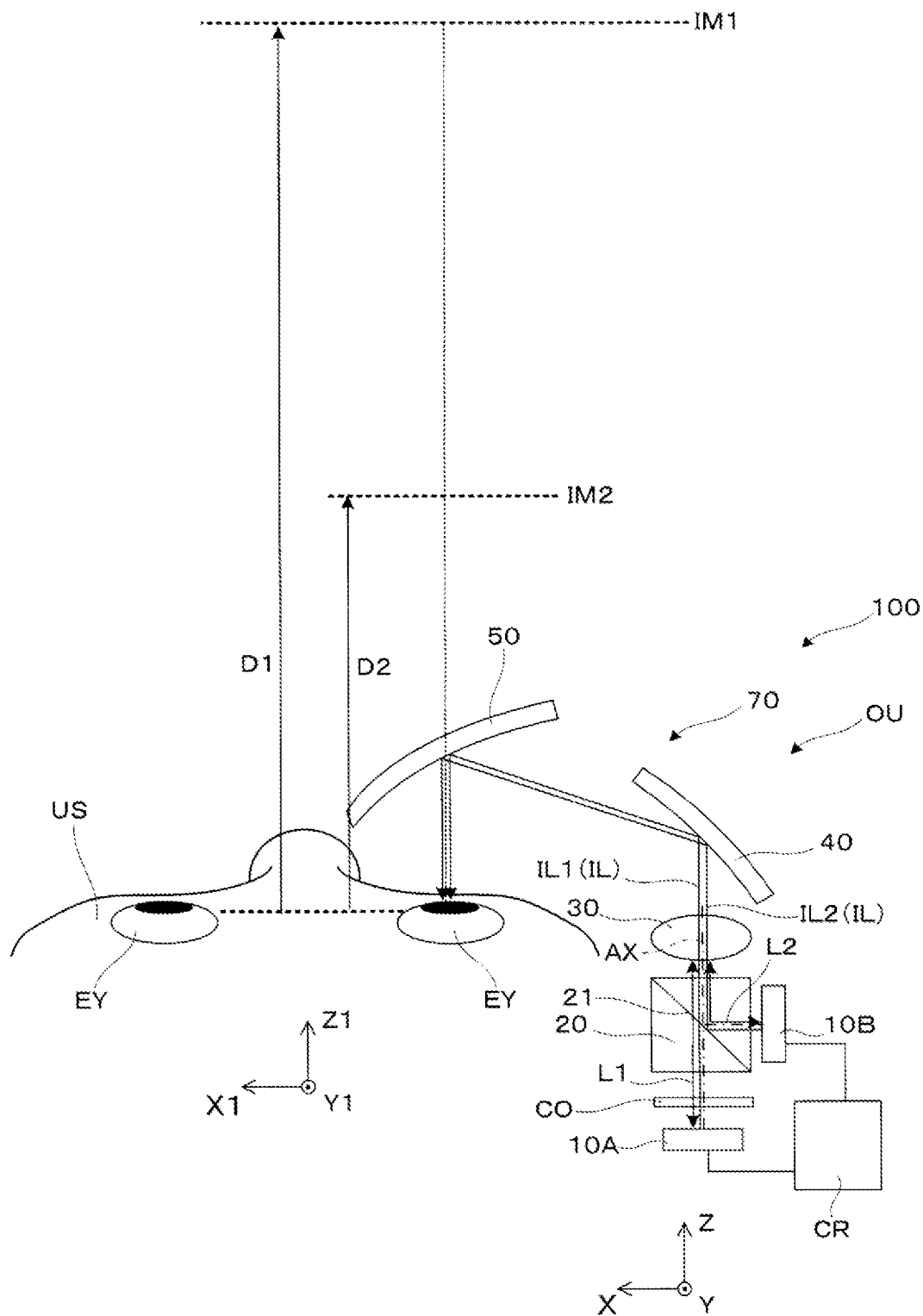
FIG. 2 is a schematic plan view used to explain a display mode of a virtual image in the virtual image display device and changes of the display mode.
Figure 3:
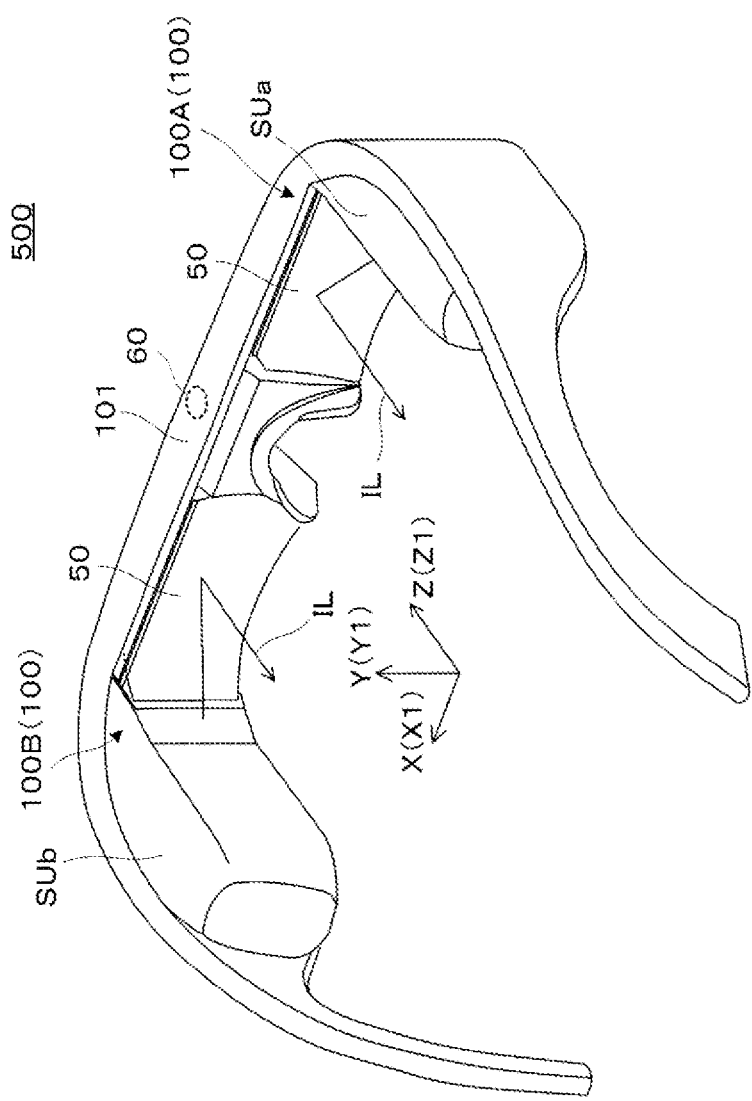
FIG. 3 is a perspective view illustrating an external appearance of a head-mounted display including a virtual image display device.

FIG. 1 is a schematic view illustrating an optical configuration of a virtual image display device 100 according to the present embodiment. The state $\alpha 1$ is a plan view illustrating how imaging light IL is guided to an eye EY of an observer (user) US. The state $\beta 1$ is a side view corresponding to the state $\alpha 1$. FIG. 2 is a schematic plan view illustrating a display mode of a virtual image in the virtual image display device 100. FIG. 3 is a perspective view illustrating an external appearance of a head-mounted display (HMD: head mounted display) 500 including the virtual image display device 100.

As illustrated, for example, in the diagram of the external appearance in FIG. 3 from among FIGS. 1 to 3, the virtual image display device 100 according to the present embodiment is disposed as a pair of left and right virtual image display devices 100A and 100B to constitute an HMD 500. In other words, the virtual image display device 100 functions as a wearing-type display device that guides imaging light IL to left and right eyes EY in a state of being mounted on the head of an observer US (see, for example, FIG. 2), thereby causing the observer US to visually recognize a virtual image. However, the virtual image display devices have a symmetrical optical structure and are similar in structure. Thus, in FIGS. 1 and 2, only elements used to guide the imaging light IL to the right eye side are illustrated as the virtual image display device 100, and no illustration or description will be made of the left eye side.

Note that the virtual image display device 100 is an optical device that not only enables the observer US to visually recognize the virtual image but also enables the observer US to observe an external image in a see-through manner. In addition, although illustration is not given, the virtual image display device 100 is able to be coupled to an external device such as a smartphone to display a virtual image so as to correspond to this external image, for example, by downloading a necessary application in the external device.

Below, one example of a structure or the like of the virtual image display device 100 will be described with reference to FIG. 1, for example. The virtual image display device 100 includes an optical unit OU including various types of optical members, and also includes a display control device CR including a CPU, various types of storage devices, or printed wired boards and configured to control the display mode.

Below, of individual portions that constitute the virtual image display device 100, one example of the configuration of the optical unit OU will be described first.

The optical unit OU includes: a first display element 10A configured to emit first imaging light IL1; a second display element 10B configured to emit second imaging light IL2; a combining optical member 20 configured to combine the first imaging light IL1 and the second imaging light IL2; a light-guiding optical system 70; and a correction optical system CO. In addition, the light-guiding optical system 70 includes a projection lens 30 serving as a projection optical system configured to guide the light that has passed through the combining optical member 20, and also includes a reflecting mirror 40 and a combiner 50 that serve as a light guiding portion that guides the light from the projection lens 30.

Here, the optical axis AX of the projection lens 30 extends along the front-rear direction at the side of the head of the observer US when worn as illustrated, for example, in FIG. 2. The combining optical member 20 and the first display element 10A are disposed so as to be aligned with the optical axis AX. In other words, the projection lens 30, the combining optical member 20, and the first display element 10A are disposed so as to be aligned with each other along the front-rear direction at the side of the head of the observer US, and the first display element 10A is located at the rearmost side of the optical unit OU. In addition, the second display element 10B is disposed at a position that corresponds to a direction of light reflected by a half mirror 21 forming the reflecting surface, the half mirror 21 being provided in the combining optical member 20. Furthermore, in the present embodiment, the optical path from the first display element 10A to the projection lens 30 differs from the optical path from the second display element 10B to the projection lens 30. This allows the observer US to visually recognize virtual images at different positions. In addition, in the present embodiment, the aspect described above further includes a correction optical system CO provided between the first display element 10A and the combining optical member 20 and configured to correct an aberration.

It should be noted that, in FIG. 1 or the like, X, Y, and Z form a Cartesian coordinate system. The ±Z direction indicates a direction parallel to the optical axis AX. The ±X direction and the ±Y direction indicate directions parallel to rectangular panel surfaces of the first display element 10A. The ±X direction is in parallel to the longitudinal direction of the panel surface. The ±Y direction is in parallel to the lateral direction. Furthermore, the ±X direction corresponds to the horizontal direction when worn. The ±Y direction corresponds to the vertical direction when worn.

Furthermore, as illustrated in FIGS. 2 and 3, the ±X1 direction indicates a direction in which a pair of left and right combiners 50 are arranged, that is, a direction (left-right direction) along a direction in which left and right eyes EY are arranged when worn. Of directions perpendicular to this direction, the vertical direction (up-down direction) when worn is set as the ±Y1 direction, and the direction (front-rear direction) perpendicular to the ±X1 direction and the ±Y1 direction is set as the ±Z1 direction. In the example illustrated in the drawings, for the purpose of convenience, the X1 direction, the Y1 direction, and the Z1 direction match the X direction, the Y direction, and the Z direction, respectively. In this case, the Z1 direction indicates a depth direction (front-rear direction) when the observer US makes visual recognition, and corresponds to the Z direction. The first display element 10A and the second display element 10B form virtual images at positions differing from each other with respect to this direction. Note that, for example, even when the Z direction and the Z1 direction do not match each other, each of the display elements 10A and 10B and the position where the virtual images are formed as described above fall in a similar correspondence.

Below, details of each element constituting the optical unit OU having the positional relationship described above will be described sequentially.

The first display element 10A is a display device configured to emit the first imaging light IL1 constituting the imaging light IL in order to form an image corresponding to a virtual image, and includes, for example, an organic EL display panel or a liquid crystal display panel. Note that, here, as one example, the first display element 10A includes a self-emitting type organic EL panel, and emits non-polarized light as the first imaging light IL1.

The second display element 10B is a display device configured to emit the second imaging light IL2 constituting the imaging light IL in order to form an image corresponding to a virtual image. Here, as one example, the second display element 10B includes a display device identical to the first display element 10A. In other words, the second display element 10B emits non-polarized light as the second imaging light IL2. However, as described above, the distance of the optical path from the second display element 10B to the light-guiding optical system 70 differs from (is shorter than) that of the first display element 10A. In addition, the first display element 10A and the second display element 10B each display a virtual image at different positions in the Z-axis (Z1 axis). This point will be described later in detail with reference to FIG. 2.

The combining optical member 20 is a cube-shaped prism member obtained by combining two glass members each having a triangular prism shape. One side surface of the cube shape is opposed to the exit surface (panel surface) of the first display element 10A. The other side surface is opposed to the exit surface (panel surface) of the second display element 10B. In addition, a half mirror 21 angled at 45 degrees relative to the optical axis AX is formed within the combining optical member 20, that is, between two glass members each having a triangular prism shape. In other words, the half mirror 21 is angled at 45° relative to the exit surface (panel surface) of the first display element 10A, that is, relative to the XY plane, and is also angled at 45° relative to the exit surface (panel surface) of the second display element 10B, that is, relative to the ZY plane. The half mirror 21 includes, for example, a thin metal film or a dielectric multilayer film. The combining optical member 20 allows a component of the first imaging light IL1 from the first display element 10A to partially pass through at the half mirror 21, and reflects some of components of the second imaging light IL2 from the second display element 10B to combine the first imaging light IL1 and the second imaging light IL2.

In the light-guiding optical system 70, the projection lens 30 is a projection optical system that projects the imaging light IL that has passed through the combining optical member 20, that is, a component of the first imaging light IL1 that has passed through and also projects a component of the second imaging light IL2 that has been reflected, thereby forming an image formation system or a portion thereof. Note that, in the drawing, illustration is given in a simplified manner. However, it is considered that the projection lens 30 is obtained, for example, by combining approximately three or four pieces of resin lenses.

In the light-guiding optical system 70, the reflecting mirror 40 is a concave mirror that reflects, toward a predetermined direction, light that has passed through the projection lens 30 with having power.

In the light-guiding optical system 70, the combiner 50 is a thin half mirror having a concave-plate shape and configured to reflect part of the components of the imaging light IL that has passed through the projection lens 30 with having power. In addition, the combiner 50 allows a portion of external light HL to pass through to guide them to the eye EY of the observer US. The configuration described above makes it possible for the virtual image display device 100 to allow the external image and the virtual image to be visually recognized in a superimposed manner, in other words, enables see-through view.

The correction optical system CO is an optical member provided between the first display element 10A and the combining optical member 20, and for example, is a lens member made of resin and having an aspherical shape. The correction optical system CO is a flat plate member having almost no power. The correction optical system CO corrects an aberration associated with the first imaging light IL1 occurring in accordance with a positional difference between the first display element 10A and the second display element 10B. Note that the example illustrated in the drawing has a configuration in which the correction optical system CO as described above is provided between the first display element 10A and the combining optical member 20 whereas no element corresponding to the correction optical system CO is provided between the second display element 10B and the combining optical member 20.

Next, the display control device CR serving as a member of the virtual image display device 100 other than the optical unit OU will be described.

The display control device CR is a control device including, for example, a CPU, various types of storage device, and the like. The display control device CR is disposed appropriately so as not to block the optical path of the optical unit OU. The display control device CR is coupled to the first display element 10A and the second display element 10B to change display modes of these elements. The display control device CR deals with the change of display modes, more specifically, enables the display mode to change in various manners, which includes, for example: displaying at the first display element 10A and displaying at the second display element 10B at the same time; turning off displaying at either one of the elements; making it bright; and making it dark.

Here, as one example of change of display modes, it is assumed that the first display element 10A and the second display element 10B each display a virtual image from positions differing from each other along the Z-axis, and the display control device is able to make selection as to switching the display performed by either one of display performed by the first display element 10A and display performed by the second display element 10B. For example, a selector switch (not illustrated) or the like is provided so as to be coupled to the display control device CR, and the display control device CR accepts an operation instruction using the selector switch by the observer US. This allows the display mode to be switched in accordance with the operation instruction by the observer US. In the case described above, the observer US manually gives an instruction to make switch in accordance with contents that the observer US views, that is, in accordance with the state where the observer US makes visual recognition. This allows the display position of the virtual image to be switched.

Below, with reference to FIG. 2, the display mode of a virtual image or change of the display mode in the virtual image display device 100 will be described in detail by giving one example.

In the drawing, the optical path from the first display element 10A to the projection lens 30 is referred to as a first optical path L1, and the optical path from the second display element 10B to the projection lens 30 is referred to as a second optical path L2. In addition, a virtual image displayed by the first display element 10A, that is, a virtual image formed by the first imaging light IL1 is referred to as a first virtual image IM1. A virtual image displayed by the second display element 10B, that is, a virtual image formed by the second imaging light IL2 is referred to as a second virtual image IM2. In other words, the first virtual image IM1 indicates a position of the virtual image that the observer US recognizes with the first imaging light IL1 from the first display element 10A. The second virtual image IM2 indicates a position of the virtual image that the observer US recognizes with the second imaging light IL2 from the second display element 10B.

As described above and illustrated in the drawing, in the present embodiment, the length (distance) differs between the first optical path L1 and the second optical path L2. In the example here, the first optical path L1 is longer than the second optical path L2. In other words, the first display element 10A is disposed at a position located further apart from the light-guiding optical system 70 than the second display element 10B, and the relationship of distance is L1>L2. Thus, the position of the first virtual image IM1 and the position of the second virtual image IM2 differ in terms of the Z1 direction. Specifically, the observer US visually recognizes the first virtual image IM1 at a position distant from the eye EY in the Z1 direction, and visually recognizes the second virtual image IM2 at a position close to the eye EY. Here, it is considered that design is performed, for example, such that the distance D1 is a long distance equal to or more than 5 m, and the distance D2 is a short distance of approximately 1 m, where the distance D1 is a distance from the position of the eye EY to the first virtual image IM1, and the distance D2 is a distance from the position of the eye EY to the second virtual image IM2. With this configuration, for example, when the observer US sees an object (actual object) located at a short distance in a case of viewing the outside world through the combiner 50, the second virtual image IM2 presented at a position close to the eye EY is displayed. When the observer US sees an object (actual object) located at a long distance, the first virtual image IM1 presented at a position distant from the eye EY is displayed. This makes it possible to reduce uncomfortable feeling when the object (actual object) and the virtual image are viewed at the same time. Note that, in the case described above, at the time of setting the first virtual image IM1 and the second virtual image IM2, it may be possible to take the angle of convergence of left and right sights into consideration.

Furthermore, when design is made such that a difference in distance exists as described above, the difference in physical distance between the first optical path L1 and the second optical path L2 is, for example, approximately a few millimeters. In other words, the first optical path L1 is longer than the second optical path L2 by a few millimeters.

Here, at the time of displaying two virtual images IM1 and IM12 at positions differing from each other, there is a case where various types of optical systems such as the projection lens 30 are designed in accordance with the position of one of the display elements (for example, the second display elements 10B) in order to form an image with high resolution (high precision). In this case, there is a possibility that an aberration occurs at the other one of the display elements (for example, the first display element 10A), which results in an image with low resolution, in other words, results in a blurred image. In contrast, in a case of the present embodiment, the correction optical system CO is provided at the other one of the display elements (first display element 10A) to make improvement in terms of this point.

Below, description will be made of an example of a configuration in FIG. 2, which relates to the aspect described above. In this case, no optical element such as a lens is provided between the second display element 10B and the half mirror 21 of the combining optical member 20, and the correction optical system CO such as a lens is disposed only between the first display element 10A and the half mirror 21, as described above. In addition, the projection lens 30 is designed such that the resolution of the second virtual image IM2 by the second display element 10B is higher than the resolution of the first virtual image IM1 by the first display element 10A.

As described above, when the projection lens 30 is designed such that the second virtual image IM2 corresponding to the second display element 10B has a higher resolution, the first virtual image IM1 corresponding to the first display element 10A located at a distance different from the distance from the projection lens 30 to the second display element 10B results in a lower resolution, which possibly causes the first virtual image IM1 to look blurred. In contrast, in a case of the present embodiment, the correction optical system CO is provided to correct the aberration in order to suppress or avoid occurrence of such a blur, thereby increasing the resolution of the first virtual image IM1. In other words, the correction optical system CO is provided in a region of the imaging light IL where only the first imaging light IL1, which is to be first virtual image IM1, passes through, in order to increase the resolution of the first virtual image IM1 by the first display element 10A using the projection lens 30. Note that it is considered that, for example, the correction optical system CO on the side of the center, which is close to the optical axis AX, has an almost flat shape in which almost no power or no aberration correcting function is provided, whereas the correction optical system CO on the peripheral side, which is located away from the optical axis AX, has an aspherical shape, thereby effectively correcting the aberration. In other words, the correction optical system CO corrects the aberration of the first imaging light IL1 in accordance with the difference in the optical path between the first display element 10A and the second display element 10B.

Furthermore, from another viewpoint in terms of the configuration described above, it can be said that items disposed between the combining optical member 20 and the second display element 10B located away from the observer US are eliminated as much as possible, and the second display element 10B is set to be the short optical path side (L2<L2), which makes it possible to suppress the degree of protrusion (suppress an increase in the size of the device) toward the lateral direction (Y direction) of the virtual image display device 100 as a whole.

With the configuration as described above, the virtual image display device 100 is able to suppress the degree of protrusion of the optical system in the lateral direction from the side surface of the head of the observer US when worn while maintaining a high resolution of the first and second virtual images IM1 and IM2, thereby making it possible to achieve miniaturization of the device.

Furthermore, as a device that utilizes the virtual image display device 100, it is possible to configure the HMD 500 as illustrated in FIG. 3 as one example, as described above. In the HMD 500 illustrated in the drawing, the virtual image display device 100 includes a pair of left and right virtual image display devices 100A and 100B. Each portion of the virtual image display device 100A, 100B is accommodated in and supported by a supporting body SUa, SUb and a frame 101 that extends in the left-right direction and supports the supporting body SUa, SUb, whereby each of the virtual image display devices 100A and 100B is fixed at a predetermined position.

In addition, the virtual image display device 100 (100A, 100B) or the HMD 500 includes an outside-world observing camera 60, for example, at an intermediate position between the virtual image display device 100A and the virtual image display device 100B. The outside-world observing camera 60 captures an external image. Data relating to the external image acquired by the outside-world observing camera 60 is used in display operation. This makes it possible, for example, to superimpose a virtual image on the external image or target object, and display it.

Note that, in the description above, a right-eye side or left-eye side virtual image display device 100 (100A, 100B) is set as the virtual image display device. However, as with the HMD 500, it may be possible to set an HMD having a pair of left and right configurations as the virtual image display device. In addition, an external device such as a smartphone (smartphone) coupled to provide the content or the like for which a virtual image is displayed may also be included as part of the virtual image display device.

Below, one modification example of the virtual image display device 100 will be described with reference to FIG. 4. Note that FIG. 4 corresponds to a diagram obtained by partially enlarging the schematic plan view illustrating the state α1 of FIG. 1. Portions that are not illustrated in the drawing or portions having the same reference characters are set to be equivalent to those described with reference to FIG. 1 or the like.

In the description of the mode given as an example with reference to FIG. 1 or the like, the observer US manually switches between turning-on of the first display element 10A and turning-on of the second display element 10B. However, the switching is not limited to this. For example, as with the modification example illustrated in FIG. 4, it may be possible to use a mode in which infrared light IR is emitted onto the eye EY of the observer US to detect the line-of-sight of the observer US on the basis of the reflected light RL to the infrared light IR, thereby making it possible to automatically switch the display. Specifically, it may be possible that, for example, a line-of-sight sensor SQ serving as a line-of-sight detecting device is provided as illustrated in the drawing. The line-of-sight sensor SQ is used to capture movement of the eye EY of the observer. Display control according to the movement is performed by the display control device CR. Note that, in the example illustrated in the drawing, the line-of-sight sensor SQ includes, for example, a light emitting portion EE and a light-receiving unit RR. Weak infrared light IR is emitted from the light emitting portion EE onto the eye EY. The reflected light RL on the cornea of the eye EY is captured by the light-receiving unit RR to detect the direction of the line-of-sight, whereby the line-of-sight sensor SQ functions as a line-of-sight detecting device. The line-of-sight sensor SQ is coupled to the display control device CR to transmit a result of detection of the line-of-sight to the display control device CR. The display control device CR identifies the direction of the line-of-sight of the eye EY on the basis of the result of detection of the line-of-sight by the line-of-sight sensor SQ. For example, the first display element 10A is turned on when it is determined to look far away, and the second display element 10B is turned on when it is determined to look closer. The display control device CR automatically performs such a switching operation. Note that, as for the line-of-sight sensor SQ, either one of the left and right eyes EY may be set to be the target of detection, or detection may be performed on both of the left and right eyes EY. When detection is performed on both of the left and right eyes EY, it is considered to employ a mode in which, for example, it is determined to look closer when the angle of convergence formed by the line-of-sight directions of the left and right eyes EY is greater than a predetermined reference value, and it is determined to look far away when the angle is less than the predetermined reference value. In addition, when detection is performed on either one of the left and right eyes, it is considered, for example, that it is determined to look far away as the direction of the line-of-sight is closer to the forward direction of the observer US, and it is determined to look closer as the direction of the line-of-sight is closer to the left or right edge.

In addition, in place of the line-of-sight sensor SQ described above, it may be possible, for example, to use, as a sensor that detects the line-of-sight, a camera provided inside the device and picking up an image of the eye EY of the observer US to presume the direction of the line-of-sight on the basis of the state of the eye EY picked up by this camera. In addition, it may be possible to provide electrodes around the eye EY of the observer US to measure the electrooculography, and presume the direction of the line-of-sight on the basis of the measured electrooculography.

As described above, the modification example described above includes the line-of-sight sensor SQ serving as the line-of-sight detecting device configured to detect the line-of-sight of the observer US. In addition, the display control device CR employs the mode in which display of the first virtual image IM1 (see FIG. 2) by the first display element 10A and display of the second virtual image IM2 (see FIG. 2) by the second display element 10B are switched in accordance with the result of detection by the line-of-sight sensor SQ.

Figure 4:
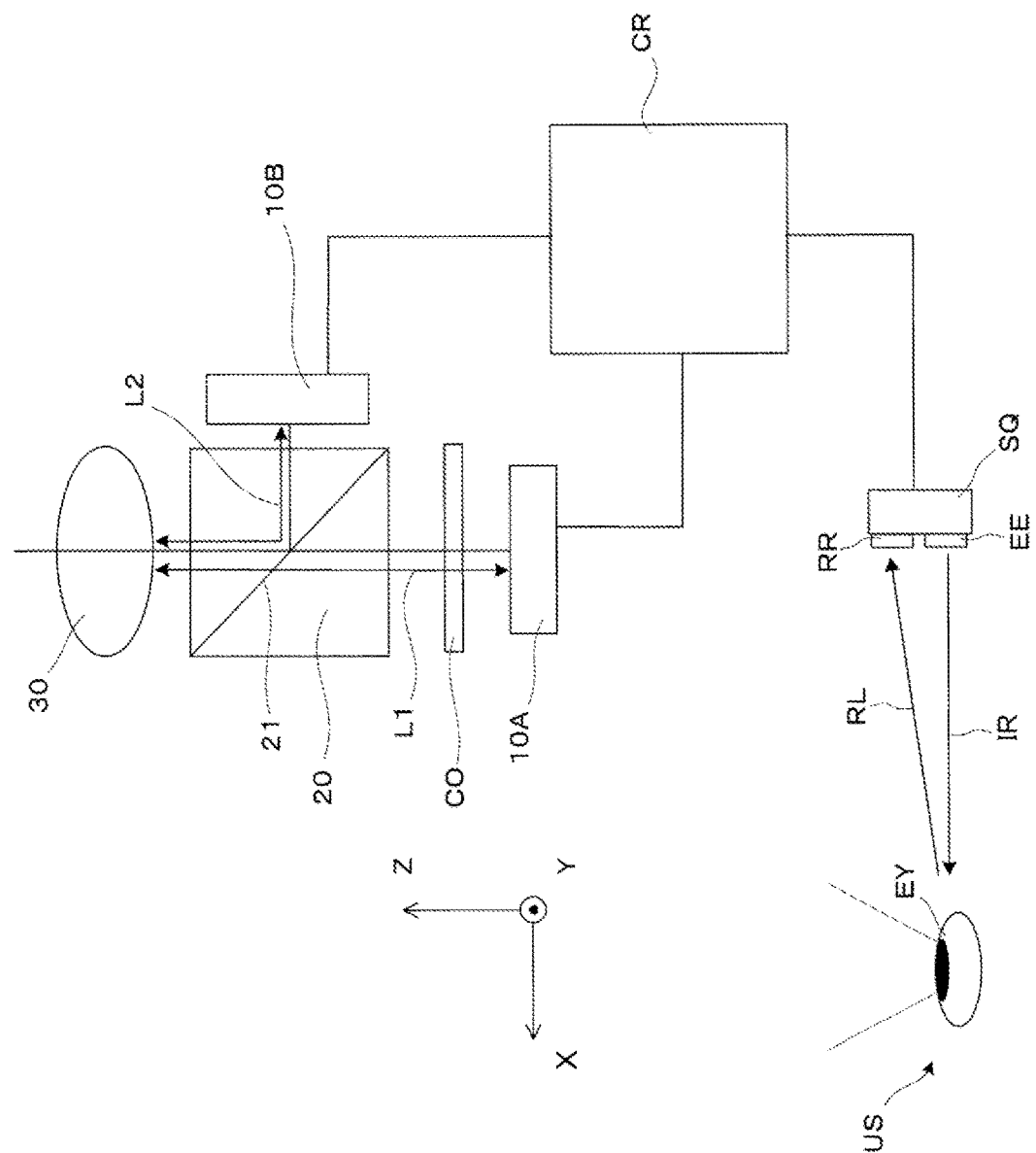
FIG. 4 is a schematic plan view used to explain one modification example of the virtual image display device.
Figure 5:
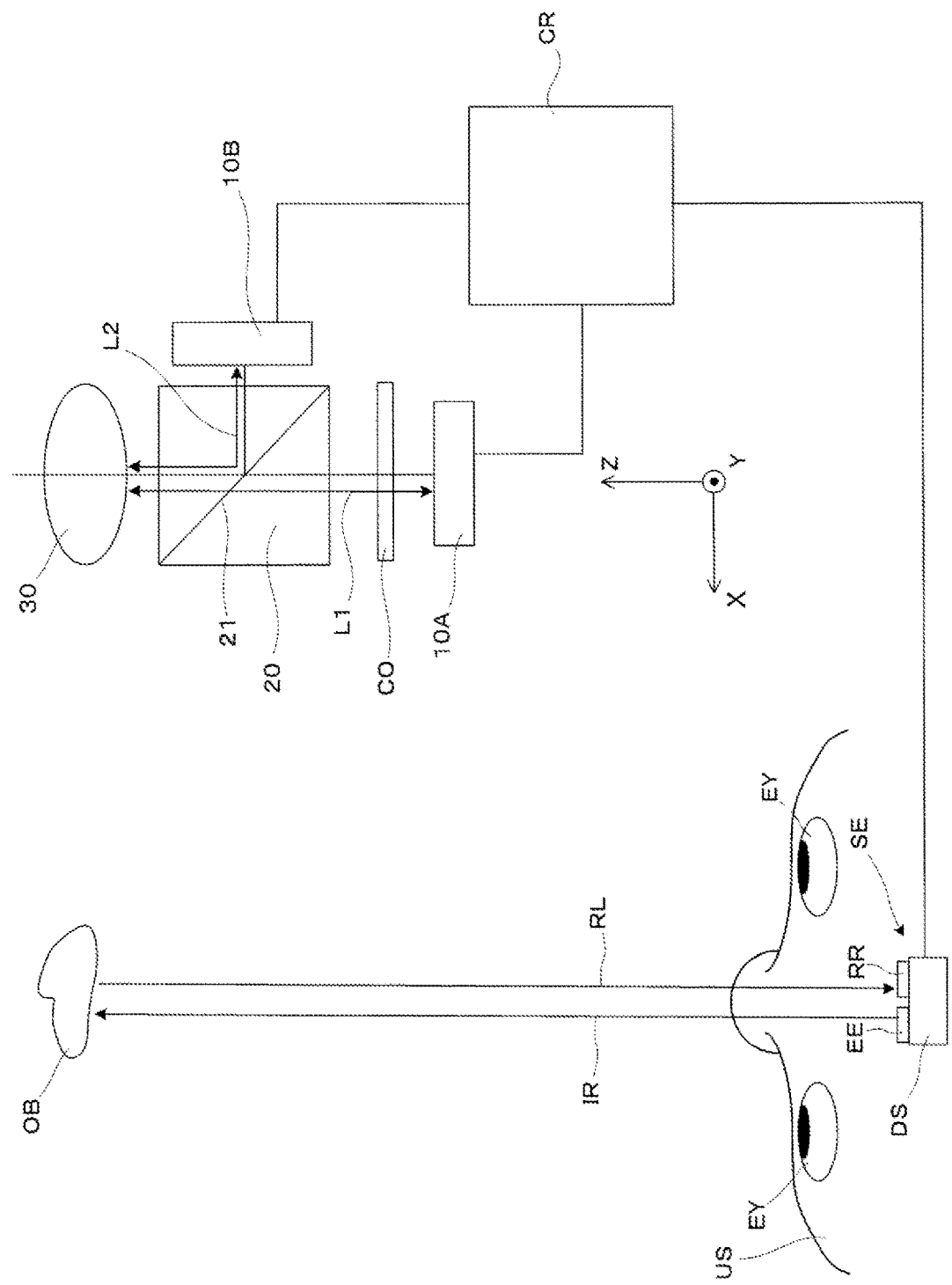
FIG. 5 is a schematic plan view used to explain another modification example of the virtual image display device.

Furthermore, as in another modification example of the virtual image display device 100 illustrated in FIG. 5, it can be considered to employ a mode in which a range sensor DS configured to measure a distance to an object OB in a front direction of the observer US is provided, and determination is made as to whether the observer looks closer or looks far away, as in the case illustrated in FIG. 4. Specifically, in FIG. 5, the range sensor DS is provided, for example, at a position corresponding to the outside-world observing camera 60 in the HDM 500 illustrated in FIG. 3. Infrared light IR is emitted from the light emitting portion EE and is reflected on an object OB existing in a direction in which the observer US is directed. The infrared light IR returns as the reflected light RL. The light-receiving unit RR captures the reflected light RL. The distance to the object OB is measured on the basis of the elapsed time from the emission of the infrared light IR to the reception of the reflected light RL. On the basis of the distance measured using the range sensor DS, the display control device CR determines whether the observer US looks closer or looks far away. In this case, on the basis of the result of detection using the range sensor DS, it is possible to switch the display in an automatic manner.

Furthermore, in place of the range sensor DS described above, it may be possible to employ a range sensor using images captured by a stereo camera, or a range sensor configured to use a monocular camera to capture two images at capturing positions differing from each other, and on the basis of the two images, measure the distance and use the result of this measurement. Alternatively, it may be possible to employ a mode in which the distance to the target object is estimated using a wireless unit such as a global positioning system (GPS) or Bluetooth (registered trademark) to use the result of the estimation.

As described above, the virtual image display device according to the present embodiment includes: the first display element 10A configured to display the first virtual image IM1; the second display element 10B configured to display the second virtual image IM2 at a position differing from the first virtual image IM2; the combining optical member 20 configured to combine the first imaging light IL1 from the first display element 10A and the second imaging light IL2 from the second display element 10B; the light-guiding optical system 70 configured to guide light that has passed through the combining optical member 20; and the correction optical system CO provided between the combining optical member 20 and either one of the first display element 10A and the second display element 10B and configured to correct an aberration in accordance with a positional difference between the first display element 10A and the second display element 10B. With this configuration, when the light-guiding optical system 70 is configured such that either one of the first display element 10A and the second display element 10B displays a virtual image in a favorable manner, the virtual image display device 100 corrects an aberration using the correction optical system CO, which makes it possible to maintain favorable display of a virtual image by the other one of the elements.

Second Embodiment

Below, a virtual image display device according to a second embodiment will be described with reference to FIG. 6. Note that a virtual image display device 200 according to the present embodiment is a modification example of the virtual image display device 100 according to the first embodiment, and is similar to the first embodiment except for the second display element 10B and a combining optical member 220. Thus, each element other than those described above will not be described in detail.

Figure 6:
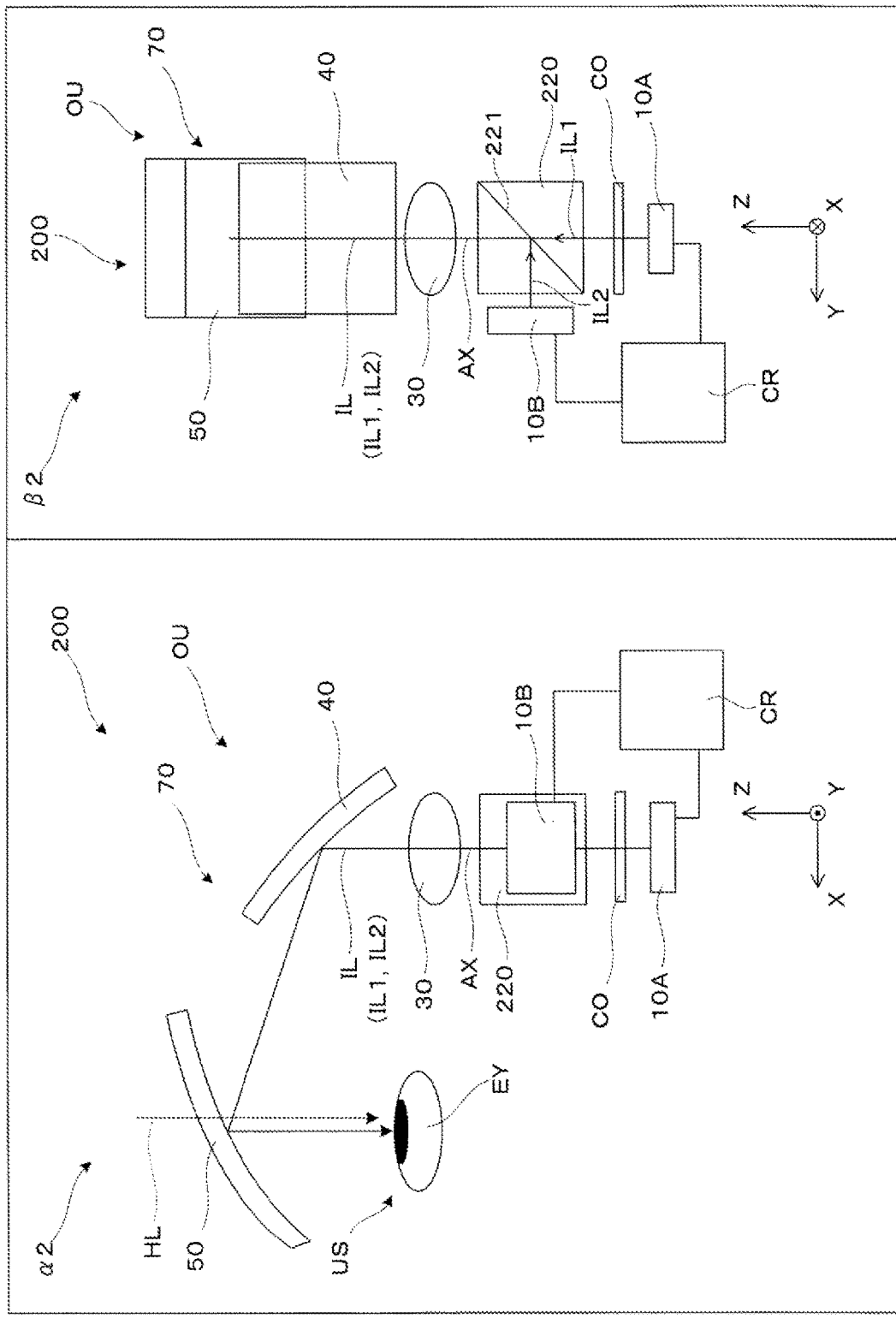
FIG. 6 is a schematic plan view and a side view each illustrating an optical configuration of a virtual image display device according to a second embodiment.

FIG. 6 is a schematic view illustrating an optical configuration of the virtual image display device 200 according to the present embodiment, and is a diagram corresponding to FIG. 1. Specifically, in FIG. 6, a state α2 is a plan view illustrating how the imaging light IL is guided to the eye EY of an observer (user) US, and corresponds to the state α1 in FIG. 1. A state β2 in FIG. 6 is a side view corresponding to the state α2, and corresponds to the state β1 in FIG. 1.

As can be clearly understood from comparison between FIG. 1 and FIG. 6, the present embodiment differs from the first embodiment in that the second display element 10B is disposed on the upper side (+Y side). In other words, in the present embodiment, the second display element 10B is disposed on the upper side of the combining optical member 220. The location of a half mirror 221 provided inside the combining optical member 220 is changed accordingly. Specifically, the second display element 10B is opposed to the side surface parallel to the XZ plane of the side surfaces of the combining optical member 220 having a cube shape. Correspondingly, the half mirror 221 is angled at 45° relative to the exit surface (panel surface) of the first display element 10A, that is, relative to the XY plane, and is also angled at 45° relative to the exit surface (panel surface) of the second display element 10B, that is, relative to the XZ plane. With the arrangement of the first display element 10A and the second display element 10B described above, the half mirror 221 of the combining optical member 220 allows a component of the first imaging light IL1 from the first display element 10A to partially pass through, and partially reflects a component of the second imaging light IL2 from the second display element 10B, thereby making it possible to combine the first imaging light IL1 and the second imaging light IL2.

In a case of the configuration described above, the second display element 10B is disposed on the upper side (+Y side). This makes it possible to further reduce the degree of protrusion from the side surface of the head of the observer US. In other words, in a case of the present embodiment, when worn, the combining optical member 220 and the first display element 10A are arranged so as to be aligned in a direction along the front-rear direction of the observer US at the sides of the head of the observer US, whereas the second display element 10B is disposed in a direction in which it is not spaced apart from the side of the head of the observer US with respect to the combining optical member 220, that is, is disposed so as not to protrude toward the −Y side.

Even in a case of the present embodiment, when the light-guiding optical system 70 is configured such that either one of the first display element 10A and the second display element 10B displays a virtual image in a favorable manner, the virtual image display device 200 corrects an aberration using the correction optical system CO, which makes it possible to maintain favorable display of a virtual image by the other one of the elements. In addition, in a case of the present embodiment, it is possible to achieve the arrangement in a further compact manner, and reduce the size of the device.

Modification Example and Other Matters

The structures described above are merely given as examples, and it is possible to change them in various manners to the extent that similar functions are able to be achieved.

For example, in the description above, the first display element 10A located at the rearmost side of the optical unit OU and the second display element 10B bent at the combining optical member 20, 220 are set such that the optical length from the first display element 10A to the projection lens 30 is longer than the optical length from the second display element 10B to the projection lens 30, in order to reduce the degree of protrusion from the side surface of the head of the observer US to achieve a reduction in the size. However, the configuration is not limited to this. It can be considered to employ a configuration in which the optical path of the second display element 10B is longer than the optical path of the first display element 10A.

In addition, for the same purpose of reducing the size, the description above employs a configuration in which: the projection lens 30 is design so as to correspond to the second display element 10B; no optical element is provided between the second display element 10B and the combining optical member 20; and the correction optical system CO is provided only between the first display element 10A and the combining optical member 20. However, the configuration is not limited to this. On the contrary, it may be possible to employ a configuration, for example, in which the correction optical system CO is provided only between the second display element 10B and the combining optical member 20.

In addition, the first display element 10A and the second display element 10B have been described as being an organic EL display panel or a liquid crystal display panel. However, each of the display elements 10A and 10B may be a self-emitting type display element typified by an LED array, a laser array, a quantum dot light-emitting element, or the like. Furthermore, it may be possible to employ a configuration using a digital micromirror device (DMD), or a display element that forms imaging light with micro electro mechanical systems (MEMES). In addition, each of the display elements 10A and 10B may be a display using a laser scanner obtained by combining a laser light source and a scanner together. Note that, in place of the liquid crystal display panel, a liquid crystal on silicon (LCOS) technology may be used.

Furthermore, in the description above, the first display element 10A and the second display element 10B employ an identical display element. However, the configuration is not limited to this, and various changes are possible. For example, it may be possible to employ a configuration in which the resolution of the panel, that is, the number of pixels in the panel differs between the first display element 10A that displays a larger image at a location distant from the observer US, and the second display element 10B that displays a smaller image at a location close to the observer US. For example, a finer image may need to be formed for a video at a more distant location. Thus, for example, the number of pixels in a panel that constitutes the first display element 10A may be greater than the number of pixels in a panel that constitutes the second display element 10B.

Furthermore, when a display element that emits polarized light is used as with a liquid crystal display panel, it may be possible to employ a polarizing beam splitter (PBS: polarizing beam splitter) to increase use efficiency of light, in place of the half mirror 21, 221.

Furthermore, as for the correction optical system CO, various modes are possible, provided that it can perform necessary aberration correction. In addition to a lens made of resin and having an aspherical shape, it may be possible to employ various types of optical members such as a Fresnel lens and a hologram lens. In addition, the number of optical members is not limited to one. It can be considered to employ a configuration in which a plural optical members constitute the correction optical system CO.

Furthermore, in the description above, the virtual image display device 100 or the like can be used as the HMD. However, use thereof is not limited to this. The virtual image display device 100 can be applied to various types of optical units. For example, the present disclosure can be applied in a head-up display (HUD: head-up display).

Furthermore, from the viewpoint of miniaturization, the description above employs a configuration in which imaging light IL1 and IL2 from the two display elements 10A and 10B is combined with one half mirror 21. However, the configuration is not limited to this. It may be considered to use a plurality of half mirrors or a plurality of combining optical members to combine imaging light from three or more display elements. In this case, it may be possible to employ, for example, a configuration in which two combining optical members (half mirrors) are disposed for three display elements; the difference in distance between the three display elements is set to be approximately several millimeters; and imaging light from the individual display elements passes through (is reflected or travels through) the combining optical members (half mirrors) twice.

In addition, description has been made of the see-through type virtual image display device in which the external image (actual object) and a virtual image are visually recognized in a superimposed manner. However, apart from this, the virtual image display device can be used in an application in which a so-called closed-type virtual reality is visually recognized, or can be used for a so-called video-see-through product including a display and an imaging device.

Furthermore, each of the embodiments described above gives an example of a configuration in which a virtual image device 100 is disposed at the side of the head of the observer US, that is, at the side of the face of the observer US. However, the configuration is not limited to this. The present application can be applied to a case in which individual constituent elements that constitute the virtual image device 100 are disposed, for example, so as to be along the upper side (forehead of the observer US) of the eye EY of the observer US, and imaging light is guided from above the eye EY.

Furthermore, various modes can be considered for the light-guiding optical system 70. For example, the present application may be applied in a configuration in which a light-guiding plate corresponding to the reflecting mirror 40 and the combiner 50 is provided, in place of the reflecting mirror 40 and the combiner 50 each guiding light and serving as optical members disposed at or after the projection lens 30 on the optical path.

Furthermore, as for the configuration described above, it may be possible to consider a configuration in which an intermediate image of the imaging light IL is provided, for example, from the projection lens 30 to the reflecting mirror 40 and the combiner 50 in the light-guiding optical system 70. However, the present application may be applied to a configuration in which no intermediate image is provided.

Furthermore, description has been made by giving an example in which the projection lens 30 is configured by combining approximately 3 or 4 resin lenses. However, the number of lenses is not limited to this. It can be considered that the number of lenses is one, two, four, or more.

Furthermore, it is possible to appropriately combine the outside-world observing camera 60, the line-of-sight sensor SQ, and the range sensor DS, which are illustrated in FIGS. 3 to 5. For example, it can be considered to employ a configuration in which: a target object located in a direction of the line-of-sight identified by the line-of-sight sensor SQ is identified on the basis of a captured image by the outside-world observing camera 60 or the like; the distance to the identified target object in the captured image is measured by the range sensor SQ; and on the basis of whether the distance is long or short, it is determined whether the observer looks far away or looks closer.

As described above, a first virtual image display device according to a specific aspect includes: the first display element configured to emit the first imaging light that forms the first virtual image; the second display element configured to emit the second imaging light that forms the second virtual image displayed at a position differing from the first virtual image in the depth direction; the combining optical member configured to combine the first imaging light from the first display element and the second imaging light from the second display element; the light-guiding optical system configured to guide light that passed through the combining optical member; and the correction optical system provided between the combining optical member and one of the first display element and the second display element and configured to correct an aberration in accordance with a positional difference between the first display element and the second display element.

In the virtual image display device described above, when the light-guiding optical system is configured such that either one of the first display element and the second display element displays a virtual image in a favorable manner, the correction optical system corrects an aberration, which makes it possible to maintain favorable display of a virtual image by the other one of the elements.

In a specific aspect, the light-guiding optical system includes the projection optical system configured to project light that has passed through the combining optical member. The optical path from the first display element to the projection optical system is longer than the optical path from the second display element to the projection optical system. The correction optical system is provided between the first display element and the combining optical member. In this case, for example, the observer visually recognizes the first virtual image at a distant location, and visually recognizes the second virtual image at a close location. At this time, the first virtual image by the first display element can be brought into a state where an aberration is corrected by the correction optical system.

In another aspect, the projection optical system is configured such that the resolution of the second virtual image corresponding to the second display element is higher than the resolution of the first virtual image corresponding to the first display element. The correction optical system corrects an aberration associated with the first imaging light in accordance with a difference in the optical path between the first display element and the second display element. In this case, the configuration of the second display element is optimized to form a favorable image. At the same time, as for the configuration of the first display element, the correction optical system is used to suppress or avoid a deterioration in the image formation based on a difference in the optical path from the second display element.

In yet another aspect, the first display element is disposed at a position located further apart from the light-guiding optical system than the second display element, and the combining optical member transmits the first imaging light from the first display element and reflects the second imaging light from the second display element to combine the first imaging light and the second imaging light. In this case, the first imaging light from the first display element is configured to pass through the combining optical member. This makes it possible, for example, to prevent the first display element from sticking out toward the side direction and increasing the size of the device, the first display element being disposed at a position located furthest apart from the light-guiding optical system.

In yet another aspect, the combining optical member and the first display element are arranged so as to be aligned in a direction along a front-rear direction of an observer at a side of a head of the observer when worn, and the second display element is disposed in a direction in which the second display element is not spaced apart from the side of the head with respect to the combining optical member. In this case, it is possible to prevent the second display element from sticking out toward the side direction and increasing the size of the device.

In yet another aspect, there is provided a display control device configured to change a display mode of the first display element and the second display element in accordance with a visual recognition state of an observer. In this case, with the display control device, it is possible to make selection and switching as to display by the first display element and display by the second display element, for example, in accordance with whether the observer looks close or looks far away.

In yet another aspect, there is provided a line-of-sight detecting device configured to detect a line-of-sight of an observer, in which a display control device switches between display of the first virtual image by the first display element and display of the second virtual image by the second display element in accordance with a result of detection by the line-of-sight detecting device. In this case, it is possible to automatically switch between display modes in accordance with the result of detection by the line-of-sight detecting device.

As described above, the optical unit according to the specific aspect includes: a first display element configured to emit first imaging light that forms a first virtual image; a second display element configured to emit second imaging light that forms a second virtual image displayed at a position differing from the first virtual image in a depth direction; a combining optical member configured to combine the first imaging light from the first display element and the second imaging light from the second display element; a light-guiding optical system configured to guide light that passed through the combining optical member; and a correction optical system provided between the combining optical member and one of the first display element and the second display element and configured to correct an aberration in accordance with a positional difference between the first display element and the second display element.

When the light-guiding optical system is configured such that either one of the first display element and the second display element displays a virtual image in a favorable manner, the optical unit corrects an aberration using the correction optical system, which makes it possible to maintain favorable display of a virtual image by the other one of the elements.

As described above, a second virtual image display device according to a specific aspect includes: the first display element configured to emit the first imaging light that forms the first virtual image; the second display element configured to emit the second imaging light that forms the second virtual image; the combining optical member configured to combine the first imaging light from the first display element and the second imaging light from the second display element; the projection optical system configured to project light that has passed through the combining optical member; and the correction optical system provided between the combining optical member and either one of the first display element and the second display element and configured to correct an aberration in accordance with a difference between the length of an optical path from the first display element to the projection optical system and the length of an optical path from the second display element to the projection optical system, in which the length of the optical path from the first display element to the projection optical system differs from the length of the optical path from the second display element to the projection optical system.

What is claimed is:

1. A virtual image display device comprising:
   a first display element configured to emit first imaging light that forms a first virtual image;
   a second display element configured to emit second imaging light that foil is a second virtual image displayed at a position differing from the first virtual image in a depth direction;
   a combining optical member configured to combine the first imaging light from the first display element and the second imaging light from the second display element;
   a light-guiding optical system configured to guide light that passed through the combining optical member; and
   a correction optical system provided between the combining optical member and either one of the first display element and the second display element and configured to correct an aberration in accordance with a positional difference between the first display element and the second display element, wherein
   the first display element and the second display element are disposed such that optical axes of the first display element and the second display element are perpendicular to each other,
   the combining optical member is disposed at a position where the optical axes of the first display element and the second display element intersect each other, and
   the light-guide optical system is disposed on an optical path of the light that passed through the combining optical member.

2. The virtual image display device according to claim 1, wherein
   the light-guiding optical system includes a projection optical system configured to project light that passed through the combining optical member,
   an optical path from the first display element to the projection optical system is longer than an optical path from the second display element to the projection optical system, and
   the correction optical system is provided between the first display element and the combining optical member.

3. The virtual image display device according to claim 2, wherein
   the projection optical system is configured such that a resolution of the second virtual image corresponding to the second display element is higher than a resolution of the first virtual image corresponding to the first display element, and
   the correction optical system corrects an aberration associated with the first imaging light in accordance with an optical path difference between an optical path of the first display element and an optical path of the second display element.

4. The virtual image display device according to claim 1, wherein
   the first display element is disposed at a position located further apart from the light-guiding optical system than the second display element, and
   the combining optical member transmits the first imaging light from the first display element and reflects the second imaging light from the second display element to combine the first imaging light and the second imaging light.

5. The virtual image display device according to claim 4, wherein
   the combining optical member and the first display element are arranged so as to be aligned in a direction along a front-rear direction of an observer at a side of a head of the observer when the device is worn, and
   the second display element is disposed in a direction in which the second display element is not spaced apart from the side of the head with respect to the combining optical member.

6. The virtual image display device according to claim 1, comprising:
   a display control device configured to change a display mode of the first display element and the second display element in accordance with a visual recognition state of an observer.

7. The virtual image display device according to claim 6, comprising:
   a line-of-sight detecting device configured to detect a line-of-sight of the observer, wherein the display control device switches between display of the first virtual image by the first display element and display of the second virtual image by the second display element in accordance with a result of detection by the line-of-sight detecting device.

8. An optical unit comprising:
a first display element configured to emit first imaging light that foul's a first virtual image;
a second display element configured to emit second imaging light that foil is a second virtual image displayed at a position differing from the first virtual image in a depth direction;
a combining optical member configured to combine the first imaging light from the first display element and the second imaging light from the second display element;
a light-guiding optical system configured to guide light that passed through the combining optical member; and
a correction optical system provided between the combining optical member and either one of the first display element and the second display element and configured to correct an aberration in accordance with a positional difference between the first display element and the second display element, wherein
the first display element and the second display element are disposed such that optical axes of the first display element and the second display element are perpendicular to each other,
the combining optical member is disposed at a position where the optical axes of the first display element and the second display element intersect each other, and
the light-guide optical system is disposed on an optical path of the light that passed through the combining optical member.

9. A virtual image display device comprising:
a first display element configured to emit a first imaging light that forms a first virtual image;
a second display element configured to emit a second imaging light that forms a second virtual image;
a combining optical member configured to combine the first imaging light from the first display element and the second imaging light from the second display element;
a projection optical system configured to project light that passed through the combining optical member; and
a correction optical system provided between the combining optical member and either one of the first display element and the second display element and configured to correct an aberration in accordance with a difference between a length of an optical path from the first display element to the projection optical system and a length of an optical path from the second display element to the projection optical system, wherein
the length of the optical path from the first display element to the projection optical system differs from the length of the optical path from the second display element to the projection optical system,
the first display element and the second display element are disposed such that optical axes of the first display element and the second display element are perpendicular to each other,
the combining optical member is disposed at a position where the optical axes of the first display element and the second display element intersect each other, and
the projection optical system is disposed on an optical path of the light that passed through the combining optical member.

\* \* \* \* \*